(12) United States Patent
Wang et al.

(10) Patent No.: US 11,506,681 B2
(45) Date of Patent: Nov. 22, 2022

(54) TWO-DIMENSIONAL WIND-SPEED AND WIND-DIRECTION SENSOR AND SYSTEM THEREOF

(71) Applicant: Laser Institute, Shandong Academy of Sciences, Shandong (CN)

(72) Inventors: Jiqiang Wang, Shandong (CN); Yanong Ning, Shandong (CN); Zhen Li, Shandong (CN); Tongyu Liu, Shandong (CN); Lin Zhao, Shandong (CN); Yuan Liu, Shandong (CN); Moyu Hou, Shandong (CN)

(73) Assignee: Laser Institute, Shandong Academy of Sciences, Shandong (CN)

( * ) Notice: Subject to any disclaimer, the term of this patent is extended or adjusted under 35 U.S.C. 154(b) by 776 days.

(21) Appl. No.: 16/336,618

(22) PCT Filed: Aug. 7, 2018

(86) PCT No.: PCT/CN2018/099090
§ 371 (c)(1),
(2) Date: Mar. 26, 2019

(87) PCT Pub. No.: WO2019/179002
PCT Pub. Date: Sep. 26, 2019

(65) Prior Publication Data
US 2021/0356491 A1 Nov. 18, 2021

(30) Foreign Application Priority Data
Mar. 20, 2018 (CN) .......................... 201810232305.3

(51) Int. Cl.
*G01P 5/10* (2006.01)
*G01K 11/3206* (2021.01)
(Continued)

(52) U.S. Cl.
CPC ............ *G01P 5/10* (2013.01); *G01K 11/3206* (2013.01); *A63B 2220/76* (2013.01); *G01P 5/26* (2013.01);
(Continued)

(58) Field of Classification Search
CPC .......... G01P 5/10; G01P 5/26; G01P 13/0086; G01P 13/045; G01K 11/3206; A63B 2220/76; G01W 1/02
See application file for complete search history.

(56) References Cited

U.S. PATENT DOCUMENTS 5,117,687 A * 6/1992 Gerardi ................... G01L 5/223
73/170.15
6,279,393 B1 * 8/2001 McLaughlin ....... G01P 13/0066
73/170.14
(Continued)

FOREIGN PATENT DOCUMENTS

| CN | 101059528 | 10/2007 |
|---|---|---|
| CN | 101294977 | 10/2008 |

(Continued)

OTHER PUBLICATIONS

International Search Report and Written Opinion dated Dec. 14, 2018 by the International Searching Authority for International Application No. PCT/CN2018/099090 filed on Aug. 7, 2018 and published as WO 2019/179002A1 (Applicant—Laser Institute, Shandong Academy of Sciences) (7 pages).

*Primary Examiner* — Nathaniel T Woodward
*Assistant Examiner* — Philip L Cotey
(74) *Attorney, Agent, or Firm* — Ballard Spahr LLP

(57) ABSTRACT

Described are a two-dimensional wind-speed and wind-direction sensor and a system thereof, relating to the field of sensing devices. The two-dimensional wind-speed and wind-direction sensor includes: an X-direction wind speed probe assembly and a Y-direction wind speed probe assem-
(Continued)

bly, the X-direction wind speed probe assembly and the Y-direction wind speed probe assembly are perpendicular to each other, and the X-direction wind speed probe assembly is configured to measure a X-direction wind speed including a wind speed in the reverse direction of an X-axis, Vx−, and a wind speed in the forward direction of the X-axis Vx+; and the Y-direction wind speed probe assembly is configured to measure a Y-direction wind speed including a wind speed in reverse direction of an Y-axis, Vy−, and a wind speed in the forward direction of the Y-axis, Vy+.

9 Claims, 5 Drawing Sheets

(51) Int. Cl.
  *G01P 5/26* (2006.01)
  *G01P 13/00* (2006.01)
  *G01P 13/04* (2006.01)
  *G01W 1/02* (2006.01)

(52) U.S. Cl.
  CPC ........ *G01P 13/0086* (2013.01); *G01P 13/045* (2013.01); *G01W 1/02* (2013.01)

(56) References Cited

U.S. PATENT DOCUMENTS

| | | | | |
|---|---|---|---|---|
| 6,370,949 | B1* | 4/2002 | Zysko | G01P 5/01 73/170.15 |
| 9,766,262 | B2* | 9/2017 | Smith | G01S 17/95 |
| 2002/0029097 | A1* | 3/2002 | Pionzio, Jr. | F03D 17/00 700/286 |
| 2004/0252290 | A1* | 12/2004 | Ferguson | G01P 5/02 356/32 |
| 2005/0022592 | A1* | 2/2005 | Shoemaker | G01P 13/02 73/170.15 |
| 2009/0046289 | A1* | 2/2009 | Caldwell | G01P 13/025 356/341 |
| 2010/0089145 | A1* | 4/2010 | Barre | G01P 13/04 73/204.11 |
| 2011/0079072 | A1* | 4/2011 | Harrison | G01P 5/12 73/170.12 |
| 2017/0108527 | A1* | 4/2017 | Harada | G01P 5/12 |
| 2018/0045751 | A1* | 2/2018 | Kearney | G01P 5/165 |
| 2018/0172809 | A1* | 6/2018 | Efimov | G01S 17/95 |

FOREIGN PATENT DOCUMENTS

| | | |
|---|---|---|
| CN | 101710130 | 5/2010 |
| CN | 102288786 A | 11/2012 |
| CN | 103018477 | 4/2013 |
| CN | 103076463 | 5/2013 |
| CN | 103197096 | 7/2013 |
| CN | 203069619 U | 7/2013 |
| CN | 103245795 | 8/2013 |
| CN | 204374230 U | 6/2015 |
| CN | 205690044 | 11/2016 |
| CN | 103399171 A | 2/2017 |
| CN | 206038716 | 3/2017 |
| CN | 206193270 | 5/2017 |
| CN | 107462348 | 12/2017 |
| CN | 107505477 | 12/2017 |
| CN | 206710450 U | 12/2017 |
| CN | 104749395 A | 1/2018 |
| EP | 2137540 B1 | 5/2017 |
| WO | WO 2008104666 | 9/2008 |

* cited by examiner

TWO-DIMENSIONAL WIND-SPEED AND WIND-DIRECTION SENSOR AND SYSTEM THEREOF

CROSS-REFERENCE TO RELATED APPLICATIONS

This application is a U.S. National Phase Application of International Application No. PCT/CN2018/099090, filed Aug. 7, 2018, which claims priority to Chinese Application No. 201810232305.3, filed Mar. 20, 2018, each of which are hereby incorporated by reference in their entirety.

TECHNICAL FIELD

The present disclosure relates to the field of sensor technologies, and in particular to a two-dimensional wind-speed and wind-direction sensor and a system thereof.

BACKGROUND ART

At present, wind speed is mainly measured by hotwire, rotation, ultrasonic and pressure difference measurement methods, among others. A hotwire wind speed sensor measures a wind speed based on the principle that the heat taken away by the wind flowing through the heating element is proportional to the wind speed. Both a wind cup wind speed sensor and a paddle wind speed sensor utilize the impeller-type wind measurement technology, and the basic principle thereof is that rotation speeds of the wind cup and the paddle are proportional to the wind speed to some degree, and the wind speeds are measured by converting the rotation speeds of the wind cup and the paddle into electric signals. An ultrasonic wind speed sensor, which adopts a pair of opposite ultrasonic transducers, measures the wind speed with the difference between transit time of ultrasonic propagation under downwind and upwind conditions. A differential pressure wind speed sensor takes advantage of the pressure difference generated on the structural body resistance member, when the wind flows through the differential pressure structure, where the pressure difference is related to the wind speed, and the wind speed can be calculated by testing the pressure difference. The above-mentioned wind speed measurement methods cannot measure the wind direction directly.

In summary, no effective solution to the measurement of the two-dimensional wind speed and wind direction is currently available, that is, the prior art fails to meet the user's demand for measuring the two-dimensional wind speed and wind direction, resulting in poor user experience.

SUMMARY

In view of the above, objects of the present disclosure includes providing a two-dimensional wind-speed and wind-direction sensor and a system thereof, to alleviate the problem that the prior art fails to meet the user's demand for measuring the two-dimensional wind speed and wind direction and thus results in poor user experience.

In a first aspect, an embodiment of the present disclosure provides a two-dimensional wind-speed and wind-direction sensor, including: an X-direction wind speed probe assembly 100 and a Y-direction wind speed probe assembly 200, wherein the X-direction wind speed probe assembly 100 and the Y-direction wind speed probe assembly 200 are perpendicular to each other, the X-direction wind speed probe assembly 100 is configured to measure an X-direction wind speed, the X-direction wind speed includes a wind speed in a reverse direction of an X-axis, Vx−, and a wind speed in a forward direction of the X-axis, Vx+; and the Y-direction wind speed probe assembly 200 is configured to measure a Y-direction wind speed, the Y-direction wind speed includes a wind speed in a reverse direction of a Y-axis, Vy−, and a wind speed in a forward direction of the Y-axis, Vy+.

In conjunction with the first aspect, an embodiment of the present disclosure provides a first possible implementation of the first aspect, where the X-direction wind speed probe assembly 100 includes: an X-direction fixing base 7, a first X-direction wind speed probe 4 and a second X-direction wind speed probe 9.

The first X-direction wind speed probe 4 and the second X-direction wind speed probe 9 are provided in opposite directions; the first X-direction wind speed probe 4 is configured to detect the wind speed in the forward direction of the X-axis, Vx+; and the second X-direction wind speed probe 9 is configured to detect the wind speed in the reverse direction of the X-axis, Vx−.

The X-direction fixing base 7 includes a first X-direction clamping slot portion 71, an X-direction clamping-slot connecting portion 73 and a second X-direction clamping slot portion 72, which are connected sequentially, the X-direction clamping-slot connecting portion 73 is of a hollow structure, an interior of the X-direction clamping-slot connecting portion 73 is provided with a first connecting optical fiber 16, and the first connecting optical fiber 16 is configured to connect the first X-direction wind speed probe 4 and the second X-direction wind speed probe 9.

A slot opening of the first X-direction clamping slot portion 71 and a slot opening of the second X-direction clamping slot portion 72 face opposite directions, a slot section of the first X-direction clamping slot portion 71 is parallel to a slot section of the second X-direction clamping slot portion 72, and the slot sections of the first X-direction clamping slot portion 71 and the second X-direction clamping slot portion 72 are perpendicular to the X-axis.

A size of the first X-direction clamping slot portion 71 and a size of the second X-direction clamping slot portion 72 respectively match a size of the first X-direction wind speed probe 4 and a size of the second X-direction wind speed probe 9); and the first X-direction clamping slot portion 71 is configured to receive the first X-direction wind speed probe 4, and the second X-direction clamping slot portion 72 is configured to receive the second X-direction wind speed probe 9.

In conjunction with the first possible implementation of the first aspect, an embodiment of the present disclosure provides a second possible implementation of the first aspect, where the Y-direction wind speed probe assembly 200 includes: a Y-direction fixing base 8, a first Y-direction wind speed probe 6 and a second Y-direction wind speed probe 10.

The first Y-direction wind speed probe 6 and the second Y-direction wind speed probe 10 are provided in opposite directions; the first Y-direction wind speed probe 6 is configured to detect the wind speed in the reverse direction of the Y-axis, Vy−; and the second Y-direction wind speed probe 10 is configured to detect the wind speed in the forward direction of the Y-axis, Vy+.

The Y-direction fixing base 8 includes a first Y-direction clamping slot portion 81, a Y-direction clamping-slot connecting portion 83 and a second Y-direction clamping slot portion 82, which are connected sequentially, the Y-direction clamping-slot connecting portion 83 is of a hollow structure, an interior of the Y-direction clamping-slot connecting portion 83 is provided with a second connecting optical fiber 17, and the second connecting optical fiber 17 is configured to connect the first Y-direction wind speed probe 6 and the second Y-direction wind speed probe 10.

A slot opening of the first Y-direction clamping slot portion 81 and a slot opening of the second Y-direction clamping slot portion 82 face opposite directions, a slot section of the first Y-direction clamping slot portion 81 is parallel to a slot section of the second Y-direction clamping slot portion 82, and the slot sections of the first Y-direction clamping slot portion 81 and the second Y-direction clamping slot portion 82 are perpendicular to the Y-axis.

A size of the first Y-direction clamping slot portion 81 and a size of the second Y-direction clamping slot portion 82 respectively match a size of the first Y-direction wind speed probe 6 and a size of the second Y-direction wind speed probe 10); and the first Y-direction clamping slot portion 81 is configured to receive the first Y-direction wind speed probe 6, and the second Y-direction clamping slot portion 82 is configured to receive the second Y-direction wind speed probe 10.

In conjunction with the second possible implementation of the first aspect, an embodiment of the present disclosure provides a third possible implementation of the first aspect, where a high-strength heat-insulating ceramic base is adopted for the X-direction fixing base 7 and/or the Y-direction fixing base 8.

In conjunction with the first aspect, an embodiment of the present disclosure provides a fourth possible implementation of the first aspect, where the two-dimensional wind-speed and wind-direction sensor further includes: a three-way joint 3, a first optical cable joint 12 and a second optical cable joint 13, wherein two ends of the X-direction wind speed probe assembly 100 are respectively connected with the three-way joint 3 and the first optical cable joint 12); and two ends of the Y-direction wind speed probe assembly 200 are respectively connected with the three-way joint 3 and the second optical cable joint 13.

In conjunction with the fourth possible implementation of the first aspect, an embodiment of the present disclosure provides a fifth possible implementation of the first aspect, where the two-dimensional wind-speed and wind-direction sensor further includes: a first bracket 2, a second bracket 14 and a third bracket 15, wherein the first bracket 2 is connected with the three-way joint 3, the second bracket 14 is connected with the first optical cable joint 12, and the third bracket 15 is connected with the second optical cable joint 13.

In conjunction with the fourth possible implementation of the first aspect, an embodiment of the present disclosure provides a sixth possible implementation of the first aspect, where the two-dimensional wind-speed and wind-direction sensor further includes an ambient temperature grating probe 11, wherein the ambient temperature grating probe 11 is provided within the second optical cable joint 13 or the first optical cable joint 12, and the ambient temperature grating probe 11 is configured to measure an ambient temperature.

In conjunction with the first aspect, an embodiment of the present disclosure provides a seventh possible implementation of the first aspect, where the X-direction wind speed probe assembly 100 and/or the Y-direction wind speed probe assembly 200 of the two-dimensional wind-speed and wind-direction sensor are connected with an external detecting device through an optical fiber 5.

The optical fiber 5 includes a first optical fiber 51 and a second optical fiber 52, the X-direction wind speed probe assembly 100 is connected with the first optical fiber 51, the Y-direction wind speed probe assembly 200 is connected with the second optical fiber 52, and the first optical fiber 51 and the second optical fiber 52 are connected in series, and configured to be connected with the detecting device.

Alternatively, the optical fiber 5 includes a first optical fiber 51 and a second optical fiber 52, the X-direction wind speed probe assembly 100 is connected with the first optical fiber 51, the Y-direction wind speed probe assembly 200 is connected with the second optical fiber 52, and the first optical fiber 51 and the second optical fiber 52 are configured to be connected to two ports of the detecting device, respectively.

In a second aspect, an embodiment of the present disclosure further provides a two-dimensional wind-speed and wind-direction sensor system, including: a detecting device 800 and the two-dimensional wind-speed and wind-direction sensor 900 according to claim 1, wherein the detecting device 800 is connected with the two-dimensional wind-speed and wind-direction sensor 900.

In conjunction with the second aspect, an embodiment of the present disclosure provides a first possible implementation of the second aspect, where the X-direction wind speed probe assembly 100 and/or the Y-direction wind speed probe assembly 200 of the two-dimensional wind-speed and wind-direction sensor 900 is connected with the detecting device 800 through an optical fiber 5.

The optical fiber 5 includes a first optical fiber 51 and a second optical fiber 52, the X-direction wind speed probe assembly 100 is connected with the first optical fiber 51, the Y-direction wind speed probe assembly 200 is connected with the second optical fiber 52); the first optical fiber 51 and the second optical fiber 52 are connected in series, and configured to be connected with the detecting device 800); the optical fiber 5 further includes a third optical fiber 53, the third optical fiber 53 is provided in an interior of a first optical cable joint or a second optical cable joint, the three optical fiber 53 is configured to be connected with one port of the detecting device 800); and the detecting device 800 includes: a pumping light source 801, an optical fiber grating demodulator 802 and a wavelength division multiplexer 803, both of the pumping light source 801 and the optical fiber grating demodulator 802 are connected with the wavelength division multiplexer 803, and the wavelength division multiplexer 803 is connected with the two-dimensional wind-speed and wind-direction sensor 900 through the third optical fiber 53.

Alternatively, the optical fiber 5 includes a first optical fiber 51 and a second optical fiber 52, the X-direction wind speed probe assembly 100 is connected with the first optical fiber 51, the Y-direction wind speed probe assembly 200 is connected with the second optical fiber 52); the first optical fiber 51 and the second optical fiber 52 are respectively connected with two ports of the detecting device 800); and the detecting device 800 includes: a pumping light source 801, an optical fiber grating demodulator 802, a wavelength division multiplexer 803 and a coupler 804, the coupler 804 includes three ports, both of the pumping light source 801 and the optical fiber grating demodulator 802 are connected with the wavelength division multiplexer 803, the wavelength division multiplexer 803 is connected with a first port of the coupler 804, and a second port and a third port of the coupler 804 are respectively connected with the first optical fiber 51 and the second optical fiber 52 of the two-dimensional wind-speed and wind-direction sensor 900.

The embodiments of the present disclosure bring about the following beneficial effects.

In the two-dimensional wind-speed and wind-direction sensor system provided by an embodiment of the present disclosure, the two-dimensional wind-speed and wind-direction sensor includes: an X-direction wind speed probe assembly and a Y-direction wind speed probe assembly, where the X-direction wind speed probe assembly and the Y-direction wind speed probe assembly are perpendicular to each other, the X-direction wind speed probe assembly is configured to measure an X-direction wind speed including a wind speed in the reverse direction of the X-axis, Vx−, and a wind speed in the forward direction of the X-axis, Vx+; and the Y-direction wind speed probe assembly is configured to measure a Y-direction wind speed including a wind speed in the reverse direction of the Y-axis, Vy−, and a wind speed in the forward direction of the Y-axis, Vy+. Therefore, the technical solution provided by an embodiment of the present disclosure can alleviate the problem that the prior art fails to meet the user's demand for measuring two-dimensional wind speed and wind direction, and thus results in poor user experience, and can improve the user experience.

In addition, the two-dimensional wind-speed and wind-direction sensor provided by an embodiment of the present disclosure has the following advantages.

1) The two-dimensional wind-speed and wind-direction sensor having four wind speed probes is implemented in an integrated way by an indigenous design, which has a simple structure and a small volume, and is convenient to be installed in dangerous places and at small spaces such as underground coal mines, for measuring the breeze vector field information at the space.

2) There is a high sensitivity as the wind speed is measured by a hotwire principle, which enables a high-precision measurement of a low wind speed, where the accuracy of the measurement of the two-dimensional wind speed and wind direction is ensured by using a highly thermal insulating material for the base of the wind speed probe, and using orthogonal and unidirectional isolation structures.

3) The two-dimensional wind-speed and wind-direction sensor can measure a change of the ambient temperature synchronously, and is a sensor which measures synchronously a wind speed, a wind direction and/or a temperature.

4) The above probe does not need power supply, is resistant to high voltage, high temperature and electromagnetic interference, and is safe and reliable under flammable and explosive environments.

Other features and advantages of the present disclosure will be set forth in the following description, and become partially apparent from the description or will be understood by implementing the invention. The objects and other advantages of the present disclosure are implemented and obtained by the structure particularly indicated in the description, the claims and the drawings.

In order to make the above objects, features and advantages of the present disclosure more apparent and understandable, preferred embodiments are indicated hereinafter and are described in detail below with reference to the accompanying drawings.

BRIEF DESCRIPTION OF DRAWINGS

In order to more clearly illustrate the specific embodiments of the present disclosure or the technical solutions in the prior art, the drawings necessarily used in the descriptions of the specific embodiments or the prior art will be briefly described below. Apparently, the drawings in the following description are some of the embodiments of the present disclosure, and those ordinary skilled in the art may obtain other drawings from those drawings without involving any inventive labor.

DETAILED DESCRIPTION OF EMBODIMENTS

Figure 1:
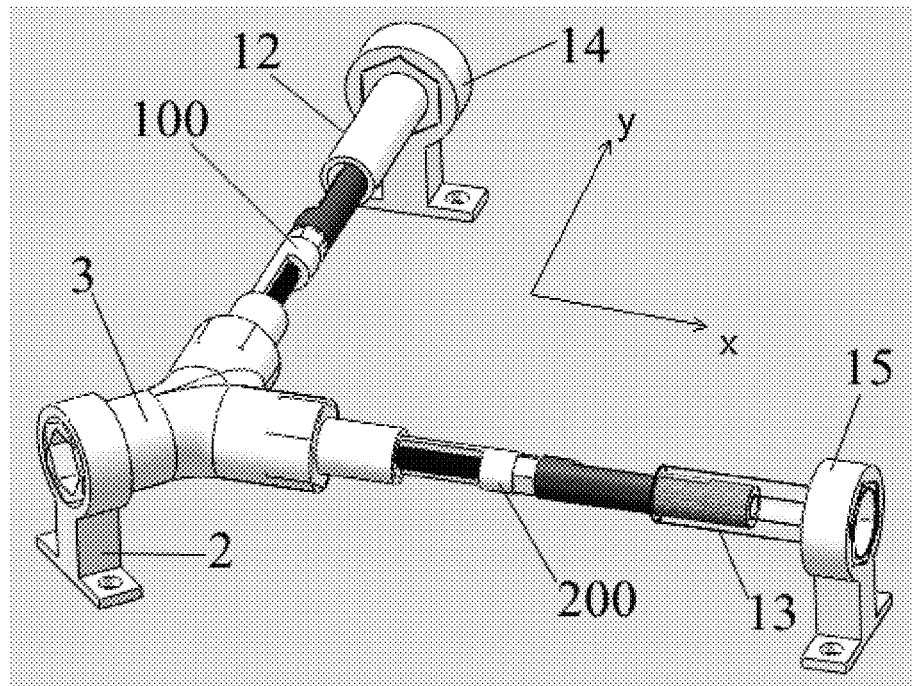
FIG. 1 is a schematic view showing an appearance of a two-dimensional wind-speed and wind-direction sensor provided by an embodiment of the present disclosure.
Figure 2:
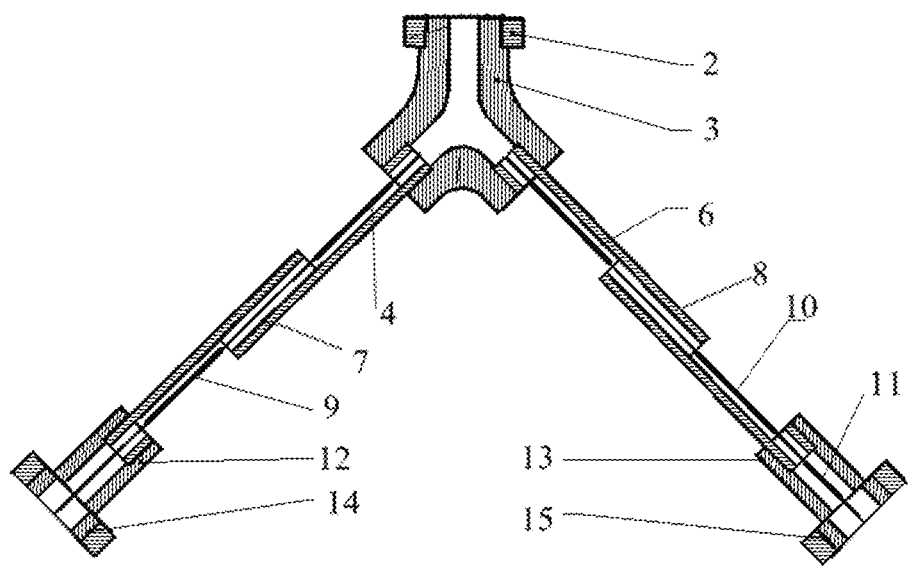
FIG. 2 is a schematic view of a two-dimensional wind-speed and wind-direction sensor provided by an embodiment of the present disclosure.
Figure 3:
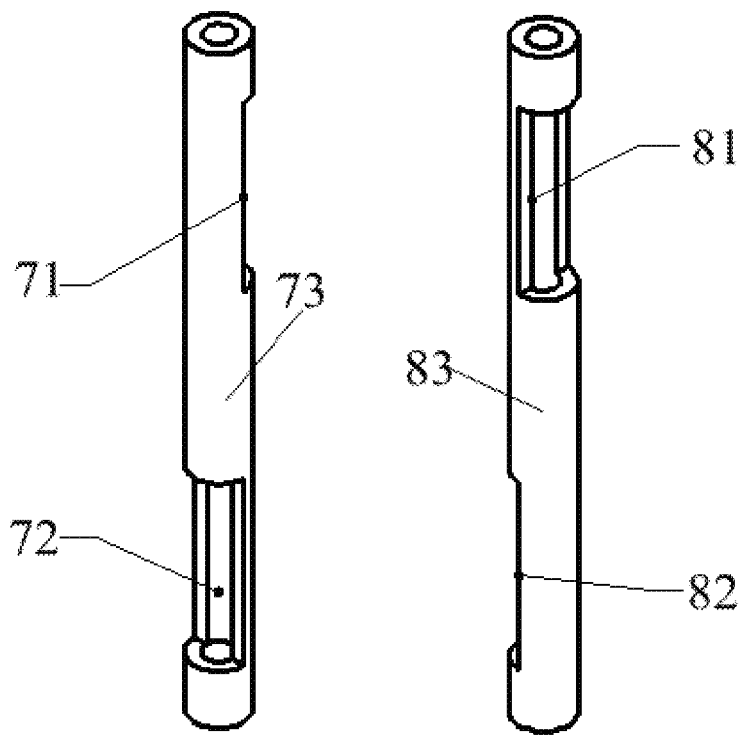
FIG. 3 is a schematic view of an X-direction fixing base and a Y-direction fixing base provided by an embodiment of the present disclosure.
Figure 4:
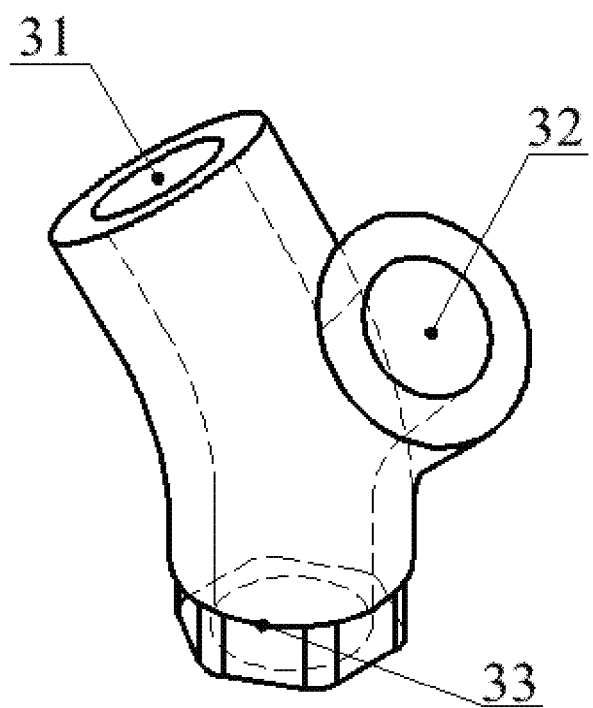
FIG. 4 is a schematic view of a three-way joint provided by an embodiment of the present disclosure.
Figure 5:
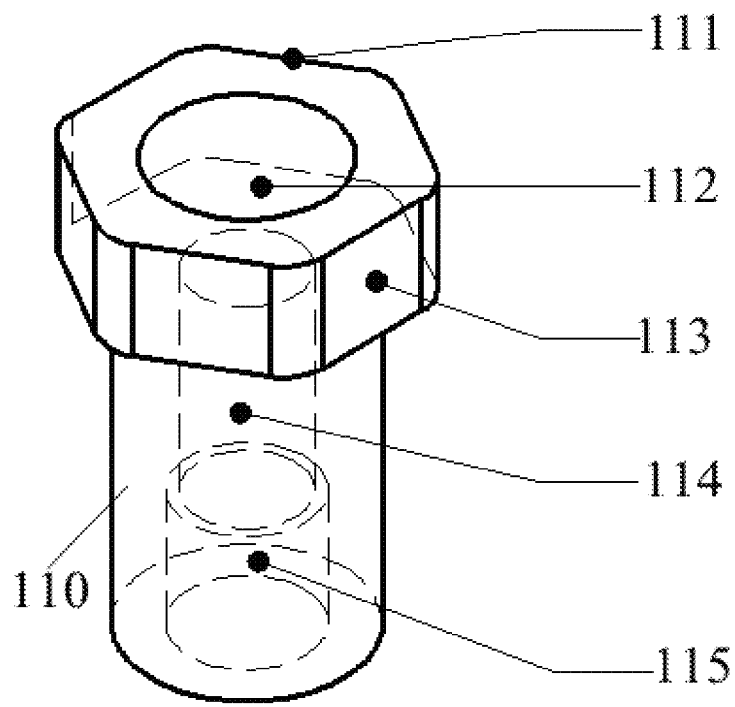
FIG. 5 is a schematic view of an optical cable joint provided by an embodiment of the present disclosure.
Figure 6:
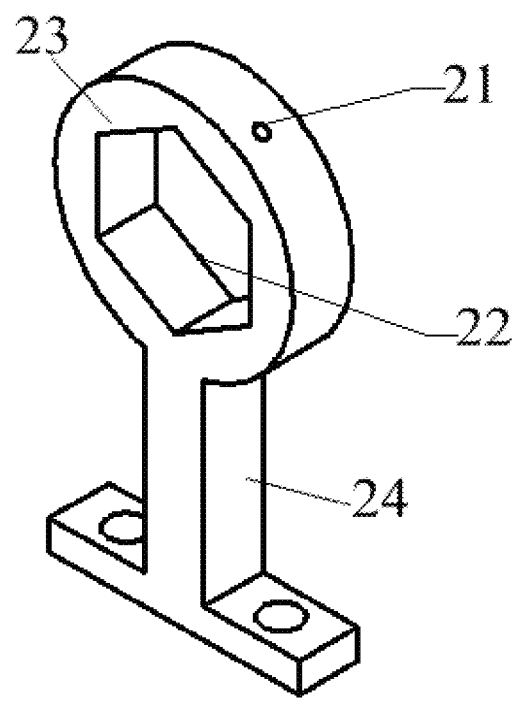
FIG. 6 is a schematic view of a bracket provided by an embodiment of the present disclosure.

In order to make the objects, technical solutions and advantages of the present disclosure clearer, the technical solutions of the present disclosure will be clearly and completely described below with reference to the accompanying drawings. It is apparent that the described embodiments are some, but not all of the embodiments of the present disclosure. All other embodiments obtained by those skilled in the art in the light of the embodiments of the present disclosure without inventive effort fall within the scope of the present disclosure.

At present, the existing wind speed or wind direction testing can only measure a single wind speed or wind direction, and cannot measure a two-dimensional wind speed and wind direction. That is, the prior art fails to meet the user's demand for measuring the two-dimensional wind speed and wind direction, resulting in poor user experience. In view of this, the two-dimensional wind-speed and wind-direction sensor and a system thereof provided by embodiments of the present disclosure can alleviate the problem that the prior art fails to meet the user's demand for measuring two-dimensional wind speed and wind direction, and thus results in poor user experience, enable the measurement of two-dimensional wind speed and wind direction, and improve the user experience.

To facilitate the understanding of this embodiment, a two-dimensional wind-speed and wind-direction sensor disclosed in an embodiment of the present disclosure will be firstly described in detail.

Embodiment 1

An embodiment of the present disclosure provides a two-dimensional wind-speed and wind-direction sensor, which can be applied to the field of breeze measurements in mines or the like.

As shown in FIGS. 1 to 6, the two-dimensional wind-speed and wind-direction sensor includes: an X-direction wind speed probe assembly 100 provided on a Y-axis and a Y-direction wind speed probe assembly 200 provided on an X-axis, with the X-direction wind speed probe assembly 100 and the Y-direction wind speed probe assembly 200 provided perpendicular to each other, and the X-direction wind speed probe assembly 100 configured to measure an X-direction wind speed Vx including a wind speed in the reverse direction of the X-axis, Vx−, and a wind speed in the forward direction of the X-axis, Vx+, and the Y-direction wind speed probe assembly 200 configured to measure a Y-direction wind speed Vy including a wind speed in the reverse direction of the Y-axis, Vy−, and a wind speed in the forward direction of the Y-axis, Vy+, and the X-direction wind speed Vx and the Y-direction wind speed Vy can be obtained by the following formula:

$$V_{x+} - V_{x-} = V_x$$

$$V_{y+} - V_{y-} = V_y$$

Further, a resultant wind speed V is:

$$V = \sqrt{V_x^2 + V_y^2}$$

Moreover, the wind direction can be represented by an angle θ with respect to the X-axis of the coordinate axes:

$$\theta = a\operatorname{ctan}\frac{V_y}{V_x}$$

Further, the X-direction wind speed probe assembly 100 includes: an X-direction fixing base 7, a first X-direction wind speed probe 4, and a second X-direction wind speed probe 9.

The first X-direction wind speed probe 4 and the second X-direction wind speed probe 9 are provided to be spaced apart from each other and face opposite directions; the first X-direction wind speed probe 4 is configured to detect a wind speed in the forward direction of the X-axis, Vx+, and the second X-direction wind speed probe 9 is configured to detect a wind speed in the reverse direction of the X-axis, Vx−.

The X-direction fixing base 7 includes a first X-direction clamping slot portion 71, an X-direction clamping-slot connecting portion 73, and a second X-direction clamping slot portion 72, which are connected sequentially. The X-direction clamping-slot connecting portion 73 is of a hollow structure. The interior of the X-direction clamping-slot connecting portion 73 is provided with a first connecting optical fiber 16, and the first connecting optical fiber 16 is configured to connect the first X-direction wind speed probe 4 and the second X-direction wind speed probe 9.

A slot opening of the first X-direction clamping slot portion 71 and a slot opening of the second X-direction clamping slot portion 72 face opposite directions. A slot section of the first X-direction clamping slot portion 71 is parallel to that of the second X-direction clamping slot portion 72, and slot sections of the first X-direction clamping slot portion 71 and the second X-direction clamping slot portion 72 are perpendicular to the X-axis.

The size of the first X-direction clamping slot portion 71 and the size of the second X-direction clamping slot portion 72 match the size of the first X-direction wind speed probe 4 and the size of the second X-direction wind speed probe 9 respectively. The first X-direction clamping slot portion 71 is configured to receive the first X-direction wind speed probe 4, and the second X-direction clamping slot portion 72 is configured to receive the second X-direction wind speed probe 9.

Further, the Y-direction wind speed probe assembly 200 includes: a Y-direction fixing base 8, a first Y-direction wind speed probe 6 and a second Y-direction wind speed probe 10.

The first Y-direction wind speed probe 6 and the second Y-direction wind speed probe 10 are provided to be spaced apart from each other and face opposite directions; the first Y-direction wind speed probe 6 is configured to detect a wind speed in the reverse direction of the Y-axis, Vy−, and the second Y-direction wind speed probe 10 is configured to detect a wind speed in the forward direction of the Y-axis, Vy+.

The Y-direction fixing base 8 includes a first Y-direction clamping slot portion 81, a Y-direction clamping-slot connecting portion 83 and a second Y-direction clamping slot portion 82, which are connected sequentially. The Y-direction clamping-slot connecting portion 83 is of a hollow structure. The interior of the Y-direction clamping-slot connecting portion 83 is provided with a second connecting optical fiber 17, and the second connecting optical fiber 17 is configured to connect the first Y-direction wind speed probe 6 and the second Y-direction wind speed probe 10.

A slot opening of the first Y-direction clamping slot portion 81 is opposite to a slot opening of the second Y-direction clamping slot portion 82 face opposite directions. A slot section of the first Y-direction clamping slot portion 81 is parallel to that of the second Y-direction clamping slot portion 82, and slot sections of the first Y-direction clamping slot portion 81 and the second Y-direction clamping slot portion 82 are perpendicular to the Y-axis.

The size of the first Y-direction clamping slot portion 81 and the size of the second Y-direction clamping slot portion 82 match the size of the first Y-direction wind speed probe 6 and the size of the second Y-direction wind speed probe 10 respectively; the first Y-direction latching slot portion 81 is configured to receive the first Y-direction wind speed probe 6, and the second Y-direction clamping slot portion 82 is configured to receive the second Y-direction wind speed probe 10.

It should be noted that the wind speed probes (including the first X-direction wind speed probe, the second X-direction wind speed probe, the first Y-direction wind speed probe, and/or the second Y-direction wind speed probe) may use any one of a doped optical fiber wind speed probe, a tapered optical fiber wind speed probe, and a staggeredly fused wind speed probe or a combination thereof; and the wind speed probes are based on an optical fiber hotwire principle, and the optical fiber 5, the first connecting optical fiber 16 and the second connecting optical fiber 17 are common single mode optical fibers (undoped single mode optical fibers).

It should be noted that the connecting optical fiber or optical fiber is connected with the probe by core welding.

Further, the wind speed probes are probes consisting of a heated optical fiber and a temperature measurement grating, combining structure and function.

Specifically, the wind speed probe is an optical fiber hotwire wind speed probe combining structure and function which is formed by writing a grating (a temperature measurement grating) in a doped single mode optical fiber (a heated optical fiber). Moreover, a single optical fiber hotwire wind speed probe has anisotropy for wind speed measurements.

Further, a high-strength heat-insulating ceramic base is adopted for the X-direction fixing base and/or Y-direction fixing base.

Specifically, a cylindrical ceramic base made of nano-zirconia is used for the X-direction fixing base and/or Y-direction fixing base. The cylindrical ceramic base is configured to protect and fix the individual wind speed probes described above and the ambient temperature grating probe described below.

The ceramic base made of a high-strength heat-insulating material protects and fixes four wind speed probes and one ambient temperature grating probe. Specifically, the ceramic base is a precisely centered cylinder having one micro hole in its center, the cylinder having a diameter of 2.5 mm with an inner hole diameter of 0.125 mm. The ambient temperature grating probe and the four wind speed probes are inserted through the inner hole of the ceramic base. The X-direction ceramic base and Y-direction ceramic base are an X-axis structure and a Y-axis structure orthogonal to each other, with each of the axes arranged with two optical fiber hotwire probes, corresponding to each of the wind speed probes. The ceramic base is provided with a slot at the center of the cylinder, and the slot has a length the same as that of the optical fiber hotwire probe. Two slots on each axis are parallel to each other, opposite in directions, and perpendicular to the other axis.

Further, the X-direction fixing base and the Y-direction fixing base have the same structural size; and the first X-direction wind speed probe, the second X-direction wind speed probe, the first Y-direction wind speed probe, and the second Y-direction wind speed probe have the same structural size.

Further, the two-dimensional wind-speed and wind-direction sensor further includes: a three-way joint 3, a first optical cable joint 12 and a second optical cable joint 13, and the two ends of the X-direction wind speed probe assembly 100 are respectively connected with the three-way joint 3 and the first optical cable joint 12; the two ends of the Y-direction wind speed probe assembly 200 are respectively connected with the three-way joint 3 and the second optical cable joint 13.

Specifically, the X-direction fixing base and the three-way joint are connected by brazing or are cooperatively connected with one sleeved on another.

The Y-direction fixing base and the three-way joint are connected by brazing or are cooperatively connected with one sleeved on another.

The first optical cable joint and the X-direction fixing base are connected by brazing or are cooperatively connected with one sleeved on another.

The second optical cable joint and the Y-direction fixing base are connected by brazing or are cooperatively connected with one sleeved on another.

Further, the three-way joint is made of stainless steel material.

The first optical cable joint and the second optical cable joint are made of stainless steel material.

Further, the two-dimensional wind-speed and wind-direction sensor further includes: a first bracket 2, a second bracket 14, and a third bracket 15, where the first bracket 2 is connected with the three-way joint 3, the second bracket 14 is connected with the first optical cable joint 12, and the third bracket 15 is connected with the second optical cable joint 13.

Further, the first bracket 2, the second bracket 14 and the third bracket 15 have the same structural size. The brackets (the first bracket 2, the second bracket 14 and the third bracket 15 are referred to as brackets in general) include a connecting portion 23 and a support portion 24; and here the connecting portion 23 includes an inner connecting hole 22.

Further, the first optical cable joint and the second optical cable joint have the same structural size, and the first optical cable joint/second optical cable joint (referred to as an optical cable joint in general) includes: a first port 110 and a second port 111.

Specifically, the three-way joint includes a first passage 31, a second passage 32 and a third passage 33. One end of the X-direction fixing base is connected with the first passage 31 of the three-way joint. The other end of the X-direction fixing base is connected with the first port 110 of the first optical cable joint. The second port 111 of the first optical cable joint is configured to be cooperatively connected with the inner connecting hole 22 of the second bracket; one end of the Y-direction fixing base is connected with the second passage 32 of the three-way joint. The other end of the Y-direction fixing base is connected with the first port 110 of the second optical cable joint. The second port 111 of the second optical cable joint is configured to be cooperatively connected with the inner connecting pore 22 of the third bracket. The third passage 33 of the three-way joint is configured to be cooperatively connected with the inner connecting hole 22 of the first bracket.

Further, the connecting portion 23 is further provided with a first fixing hole 21.

The first port includes a connecting slot 115 and a hollow slot 114 which are connected. The connecting slot 115 and the hollow slot 114 are of a stepped shape, and the second port includes a second fixing hole 113 and a cable connecting hole 112.

Specifically, the connecting slot 115 is configured to be fixedly connected with the fixing base (including the X-direction fixing base and the Y-direction fixing base) by brazing.

The second fixing hole 113 of the second port 111 of the first optical cable joint is configured to be cooperatively connected with the first fixing hole 21 of the second bracket; the second fixing hole 113 of the second port 111 of the second optical cable joint is configured to be cooperatively connected with the first fixing holes 21 of the third bracket, performing a function of preventing axial sliding. Specifically, after the sensor is installed, the brackets and the corresponding joint (optical cable joint and/or three-way joint) are fixed by screws to prevent axial sliding.

Specifically, in the present embodiment, the outer wall of the third passage 33 is in shape of a regular hexagonal boss, the second port 111 is a regular hexagonal boss, and the inner connecting hole 22 is an inner hexagonal hole that cooperates with the regular hexagonal boss.

In order to synchronously measure the ambient temperature, furthermore, the two-dimensional wind-speed and wind-direction sensor further includes an ambient temperature grating probe 11, with the ambient temperature grating probe 11 provided within the second optical cable joint 13 or the first optical cable joint 12, and the ambient temperature grating probe 11 is configured to measure an ambient temperature.

Specifically, in the present embodiment, the ambient temperature grating probe 11 is provided within the hollow slot 114 of the second optical cable joint 13. Of course, the ambient temperature grating probe 11 can also be provided within the hollow slot 114 of the first optical cable joint 12.

Further, the ambient temperature grating probe includes a (common) single mode optical fiber that is written with an ambient temperature measurement grating.

The X-direction wind speed probe assembly 100 and/or the Y-direction wind speed probe assembly 200 in this embodiment are/is connected with an external detecting device via the optical fiber 5. The application range of the two-dimensional wind-speed and wind-direction sensor in this application is broadened, in order to meet the connection requirements of different detecting device interfaces.

Further, the X-direction wind speed probe assembly 100 and the Y-direction wind speed probe assembly 200 may be connected in series with or parallelly to the external detecting device.

In an embodiment, the X-direction wind speed probe assembly 100 and the Y-direction wind speed probe assembly 200 may be connected with the external detecting device in a serial form.

A series-connected structure of the two-dimensional wind-speed and wind-direction sensor provided by an embodiment of the present disclosure will be briefly described below with reference to FIG. 7.

The optical fiber 5 includes a first optical fiber 51 and a second optical fiber 52. The X-direction wind speed probe assembly 100 is connected with the first optical fiber 51, and the Y-direction wind speed probe assembly 200 is connected with the second optical fiber 52; and the first optical fiber 51 and the second optical fiber 52 are connected in series, and configured to be connected with the detecting device.

Specifically, the first X-direction wind speed probe 4 of the X-direction wind speed probe assembly 100 is connected with one end of the first optical fiber 51, and the first Y-direction wind speed probe 6 of the Y-direction wind speed probe assembly 200 is connected with one end of the second optical fiber 52, and the other end of the first optical fiber 51 and the other end of the second optical fiber 52 are connected in series.

Further, the optical fiber 5 further includes a third optical fiber 53, the X-direction wind speed probe assembly 100 is connected with the first optical fiber 51, and the Y-direction wind speed probe assembly 200 is connected with the second optical fiber 52; and the first optical fiber 51 and the second optical fiber 52 are connected in series, and the third optical fiber 53 is connected with one port of the detecting device.

Figure 7:
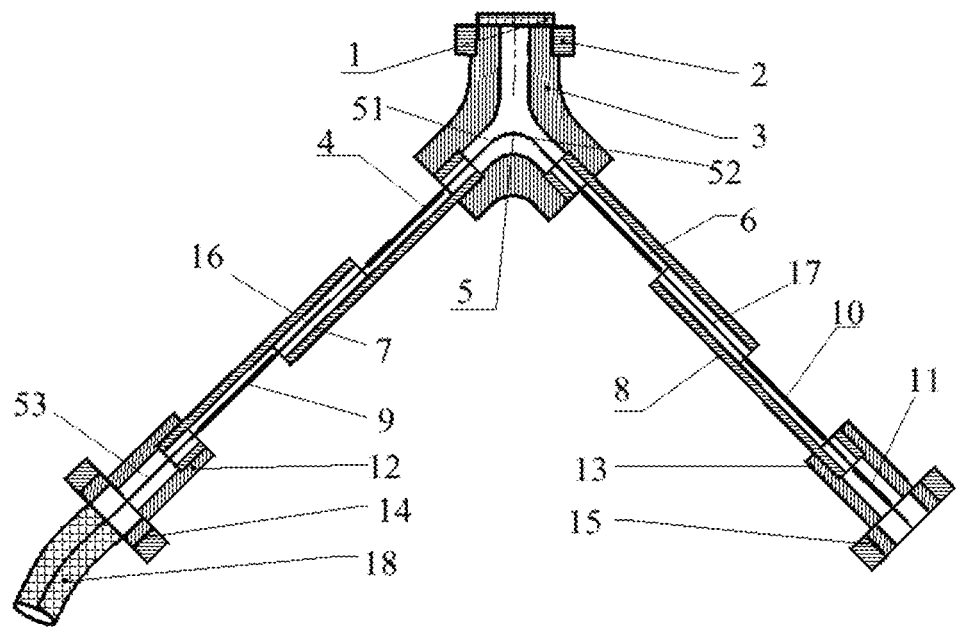
FIG. 7 is a schematic view showing a series-connected structure of a two-dimensional wind-speed and wind-direction sensor provided by an embodiment of the present disclosure.

Specifically, in FIG. 7, the third optical fiber 53 is provided within the hollow slot 114 of the first optical cable joint 12.

The third optical fiber 53 is connected externally with a port of the detecting device through a connecting cable 18 connected with the cable connecting hole 112 of the first optical cable joint.

Further, in case of serial connection, the third passage 33 of the three-way joint 3 may be provided with a sealing cap 1, with the sealing cap 1 configured to seal the third passage 33, thereby preventing dust from entering the interior of the three-way joint, affecting the measurement accuracy. Similarly, the cable connecting hole of the second port of the second optical cable joint can also be provided with a closed means (for example, a cap, not shown) for sealing.

Of course, the third optical fiber 53 may also be provided within the hollow slot 114 of the second optical cable joint 13. In other words, the third optical fiber 53 and the ambient temperature grating probe 11 are respectively provided within the first optical cable joint 12 and the second optical cable joint 13.

It should be noted that any one of the third optical fiber 53 and the ambient temperature grating probe may be provided within the first optical cable joint 12 or the second optical cable joint 13. Specifically, arrangement may be made as actually required.

In another embodiment, the X-direction wind speed probe assembly 100 and the Y-direction wind speed probe assembly 200 may be connected with the external detecting device in a parallel form.

A series-connected structure of the two-dimensional wind-speed and wind-direction sensor provided by an embodiment of the present disclosure will be briefly described below with reference to FIG. 8.

The optical fiber 5 includes a first optical fiber 51 and a second optical fiber 52, the X-direction wind speed probe assembly 100 is connected with the first optical fiber 51, and the Y-direction wind speed probe assembly 200 is connected with the second optical fiber 52; and the first optical fiber 51 and the second optical fiber 52 are configured to be connected to two ports of the detecting device, respectively.

Specifically, the first X-direction wind speed probe 4 of the X-direction wind speed probe assembly 100 is connected with one end of the first optical fiber 51. The first Y-direction wind speed probe 6 of the Y-direction wind speed probe assembly 200 is connected with one end of the second optical fiber 52. The other end of the first optical fiber 51 and the other end of the second optical fiber 52 are respectively connected with two ports of the detecting device.

Figure 8:
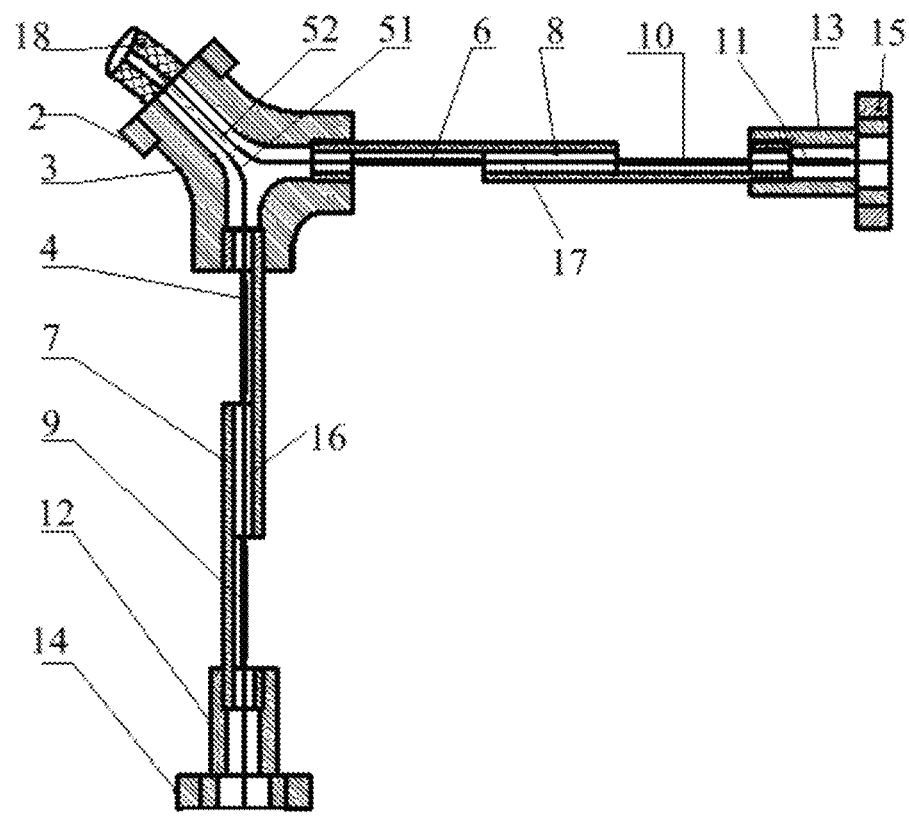
FIG. 8 is a schematic view showing a parallel-connected structure of a two-dimensional wind-speed and wind-direction sensor provided by an embodiment of the present disclosure.

Further, in FIG. 8, the optical fiber 5 may also include a third optical fiber 53, and the third optical fiber 53 is provided within the hollow slot 114 of the first optical cable joint 12.

The first optical fiber 51 and the second optical fiber 52 are respectively connected externally to two ports of the detecting device through cables connected with the third passage 33 of the three-way joint 3.

Further, in case of parallel connection, the cable connecting hole of the second port of the first optical cable joint and/or the cable connecting hole of the second port of the second optical cable joint may also be provided with a closed means (for example, a sealing cap, not shown in the figure) for sealing.

The main body of the two-dimensional wind-speed and wind-direction sensor provided by an embodiment of the present disclosure includes wind speed probe assemblies having an X-axis structure and a Y-axis structure orthogonal to each other, which can implement the detection of the two-dimensional wind speed and wind direction. Specifically, in a technical solution provided by an embodiment of the present disclosure, two optical fiber hotwire probes and one ceramic base are provided on each axis (or each probe assembly), and at least one axis of the two axes may also be provided with an ambient temperature grating probe to detect an ambient temperature, and four optical fibers hotwire wind speed probes are inserted through the inner hole of the ceramic base. The optical fiber hotwire probe and the ambient temperature grating probe are protected and fixed by the cylindrical ceramic base which has been processed by cutting, where at a position of each optical fiber hotwire wind speed probe, an open slot is provided by cutting half of the ceramic base at the X-axis from its central axis position, with the slot having a length the same as that of the optical fiber hotwire probe, and moreover it is ensured that two slots are opposite in direction, parallel in their slot sections and perpendicular to the Y-axis; likewise, corresponding to a position of two optical fiber hotwire probes at the y-axis, a slot is provided by cutting half of the ceramic base at the y-axis from its central axis position, with the slot having a length the same as that of the optical fiber hotwire probe, and moreover it is ensured that two slots are opposite in direction, parallel in their slot sections and perpendicular to the x-axis.

Furthermore, the embodiment of the present disclosure has the following beneficial effects.

1) The two-dimensional wind-speed and wind-direction sensor having four wind speed probes is implemented in an integrated way by an indigenous design, which has a simple structure and a small volume, and is convenient to be installed in dangerous places and at small spaces such as underground coal mines, for measuring the breeze vector field information at the space.

2) There is a high sensitivity as the wind speed is measured by a hotwire principle, which enables a high-precision measurement of a low wind speed, where the accuracy of the measurement of the two-dimensional wind speed and wind direction is ensured by using a highly thermal insulating material for the base of the wind speed probe, and using orthogonal and unidirectional isolation structures.

3) The two-dimensional wind-speed and wind-direction sensor can measure a change of the ambient temperature synchronously, and is a sensor which measures synchronously a wind speed, a wind direction and/or a temperature.

4) The above probe does not need power supply, is resistant to high voltage, high temperature and electromagnetic interference, and is safe and reliable under flammable and explosive environments.

Finally, it should be pointed out that (1) the doped optical fiber wind speed probe can be produced with other types of optical fiber having different dopants or having different doping concentrations according to the measurement range, the measurement precision, etc. Other structural forms, such as metal film coated probes (in this case, the ceramic base is not needed, and the forward wind speed and wind direction and the reverse wind speed and wind direction are measured directly by coating film for a common single mode optical fiber at a preset interval in forward and reverse directions), a tapered optical fiber probe, a staggeredly fused probe, etc., or a combination of the above.

(2) The ceramic base may be replaced with other high-strength heat-insulating materials, and the inner hole diameter of the ceramic base may match the diameters of the four wind speed probes, one ambient temperature grating probe and the connecting optical fiber (which are consistent) as specifically required by design.

(3) Four wind speed probes and one ambient temperature grating probe may be arbitrarily combined without changing the above-mentioned principle of wind speed and wind direction measurement, forming various serial-parallel system schemes and internal structures of the sensor.

Embodiment 2

Figure 9:
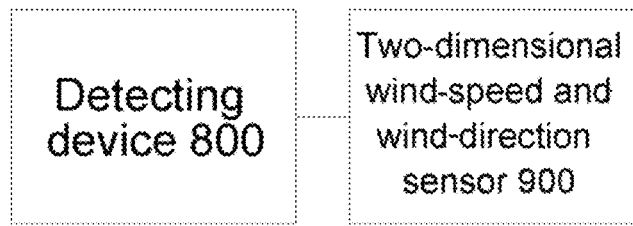
FIG. 9 is a structural block diagram of a two-dimensional wind-speed and wind-direction sensor system provided by an embodiment of the present disclosure.

FIG. 9 is a structural block diagram of a two-dimensional wind-speed and wind-direction sensor system provided by an embodiment of the present disclosure, and the system includes: a detecting device 800 and a two-dimensional wind-speed and wind-direction sensor 900 according to Embodiment 1, where the detecting device is connected with the two-dimensional wind-speed and wind-direction sensor.

Figure 10:
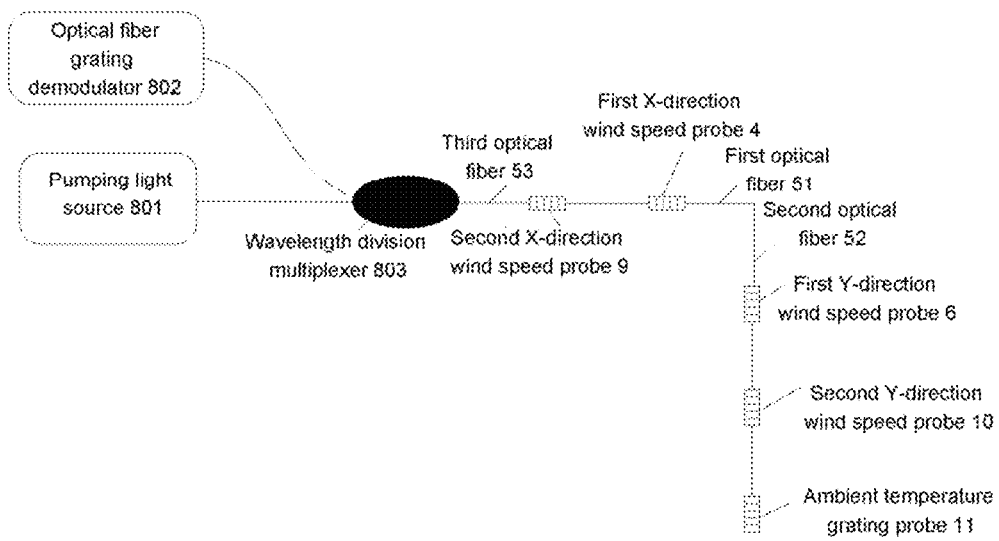
FIG. 10 is a schematic view showing a series-connected structure of a two-dimensional wind-speed and wind-direction sensor system provided by an embodiment of the present disclosure.
Figure 11:
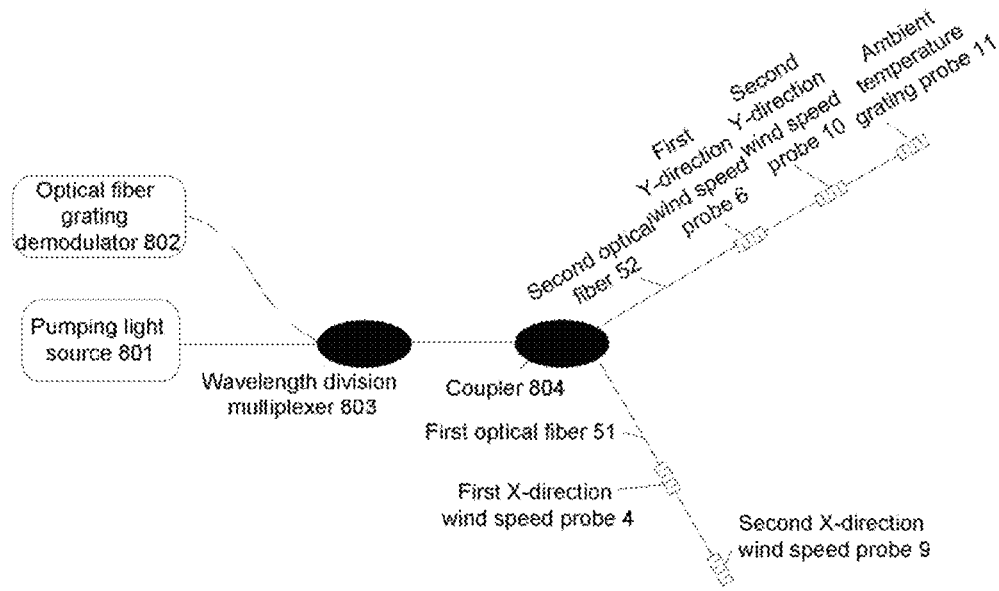
FIG. 11 is a schematic view showing a parallel-connected structure of a two-dimensional wind-speed and wind-direction sensor system provided by an embodiment of the present disclosure.

Further, according to different connection forms of the wind speed probe and different ports of the detecting device, the system may have a series-connected system structure and a parallel-connected system structure, as shown in FIGS. 10 and 11, respectively.

FIG. 10 is a schematic view showing a series-connected structure of a two-dimensional wind-speed and wind-direction sensor system provided by an embodiment of the present disclosure.

Referring to FIG. 10, the X-direction wind speed probe assembly and the Y-direction wind speed probe assembly of the two-dimensional wind-speed and wind-direction sensor are connected with the detecting device through optical fibers 5; the optical fiber 5 includes a first optical fiber 51 and a second optical fiber 52, the X-direction wind speed probe assembly is connected with the first optical fiber 51, and the Y-direction wind speed probe assembly is connected with the second optical fiber 52; and the first optical fiber 51 and the second optical fiber 52 are connected in series, and configured to be connected with the detecting device.

Specifically, the first X-direction wind speed probe 4 of the X-direction wind speed probe assembly is connected with one end of the first optical fiber 51, and the first Y-direction wind speed probe 6 of the Y-direction wind speed probe assembly is connected with one end of the second optical fiber 52, and the other end of the first optical fiber 51 and the other end of the second optical fiber 52 are connected in series.

The optical fiber 5 further includes a third optical fiber 53; the X-direction wind speed probe assembly is connected with the first optical fiber 51, and the Y-direction wind speed probe assembly is connected with the second optical fiber 52; the first optical fiber 51 and the second optical fiber 52 are connected in series, and the third optical fiber 53 is connected with one port of the detecting device.

Specifically, the third optical fiber 53 is provided within the first optical cable joint 12 or the second optical cable joint 13, and the third optical fiber 53 is configured to be connected with one port of the detecting device; the detecting device includes: a pumping light source 801, an optical fiber grating demodulator 802 and a wavelength division multiplexer 803, where the pumping light source and the optical fiber grating demodulator are connected with the wavelength division multiplexer, and the wavelength division multiplexer is connected with the two-dimensional wind-speed and wind-direction sensor through the third optical fiber 53.

In the series-connected structure, the pumping light source and the probing light of the optical fiber grating demodulator, after being combined by the wavelength division multiplexer, are injected directly into an optical fiber grating array consisting of the ambient temperature grating probe and four wind speed probes (specifically, the optical fibers hotwire wind speed probe based on the optical fiber hotwire principle are used), where the optical fiber hotwire wind speed probes absorb the pumping laser energy and release heat, so that a temperature change occurs in the corresponding grating zone, forming a specific temperature field, and accordingly the demodulation wavelength corresponding to the grating shifts with the temperature change of the grating zone. When the sensor is placed in different wind fields, the temperature of the corresponding optical fiber hot wire wind speed probe and the ambient temperature measured by the ambient temperature grating are measured in real time by the optical fiber grating demodulator and a demodulation software, thereby further calculating the wind speed value of each optical fiber hot wire wind speed probe in corresponding measurement direction.

FIG. 11 is a schematic view showing a parallel-connected structure of a two-dimensional wind-speed and wind-direction sensor system provided by an embodiment of the present disclosure.

Referring to FIG. 11, the X-direction wind speed probe assembly and the Y-direction wind speed probe assembly of the two-dimensional wind-speed and wind-direction sensor are connected with the detecting device through the optical fiber 5.

The optical fiber 5 includes a first optical fiber 51 and a second optical fiber 52, the X-direction wind speed probe assembly is connected with the first optical fiber 51, and the Y-direction wind speed probe assembly is connected with the second optical fiber 52; the first optical fiber 51 and the second optical fiber 52 are respectively connected with two ports of the detecting device. The detecting device includes: a pumping light source 801, an optical fiber grating demodulator 802, a wavelength division multiplexer 803 and a coupler 804, where the coupler 804 includes three ports, both of the pumping light source and the optical fiber grating demodulator are connected with the wavelength division multiplexer, and the wavelength division multiplexer is connected with a first port of the coupler, and the second port and the third port of the coupler are respectively connected with the first optical fiber 51 and the second optical fiber 52 of the two-dimensional wind-speed and wind-direction sensor.

Further, a pumping laser is used for the pumping light source 801.

Further, a 1*2 optical coupler is used for the coupler.

In the parallel-connected structure, the pumping light source and the probing light of the optical fiber grating demodulator, after being combined by a wavelength division multiplexer, are split by a 1*2 coupler (50:50), and then injected, through the first optical fiber 51, into two X-direction wind speed probes on the Y-axis, respectively, and injected, through the second optical fiber 52, into two Y-direction wind speed probes on the X-axis and the ambient temperature grating probe.

The four wind speed probes are preferably made by writing an FBG (optical fiber grating) on a doped single mode optical fiber, and the one ambient temperature grating is made by writing an FBG on a common single mode optical fiber.

Specifically, in this embodiment, each wind speed probe is made by writing a grating having a length of 5 mm on a doped optical fiber having a length of 8 mm, with a cut segment corresponding to each ceramic base also having a length of 8 mm. The injected pumping laser is distributed to four optical fiber hotwire probes by adjusting the conditions such as doping concentrations, hotwire lengths photothermal conversion efficiencies and/or etc. to ensure the precision of the wind speed measurements by the four optical fiber hotwire probes.

The two-dimensional wind-speed and wind-direction sensor system provided by an embodiment of the present disclosure has the same technical features as those of the two-dimensional wind-speed and wind-direction sensor provided by the above embodiments, and thus can solve the same technical problems and bring about the same technical effects.

In addition, in the description of the embodiments of the present disclosure, it should be indicated that unless otherwise expressly specified or defined, terms "install", "couple", and "connect" should be understood broadly, and for example, a connection may be a fixed connection, or a detachable connection, or an integrated connection; may be a mechanical connection or an electric connection; or may be a direct connection, or an indirect connection via an intermediate medium, or may be an internal communication between two elements. The specific meanings of the above-mentioned terms in the present disclosure could be understood by those skilled in the art according to specific situations.

In the description of the present disclosure, it should be indicated that orientation or positional relations indicated by terms such as "center", "up", "down", "left", "right", "vertical", "horizontal", "inside", and "outside" are based on the orientation or positional relations as shown in the figures, only for facilitating description of the present disclosure and simplifying the description, rather than indicating or implying that the referred devices or elements must be in a particular orientation or constructed or operated in a particular orientation, and therefore they should not be construed as limiting the present disclosure. In addition, terms such as "first", "second" and "third" are used only for description, and should not be understood as indicating or implying importance in relativity.

Finally, it should be noted that the above embodiments are only specific embodiments of the present disclosure, and are used to illustrate the technical solution of the present disclosure, and are not intended to limit the present disclosure, and the scope of protection of the present disclosure is not limited thereto. Although the present disclosure has been described in detail with reference to the foregoing embodiments, those ordinary skilled in the art should understand that any of those skilled in the art familiar with the techniques in the art would still modify the technical solutions described in the foregoing embodiments or would readily conceive of variations within the technical scope disclosed by the present disclosure, or replace some of the technical features therein with equivalents, and such modifications, variations, or substitutions do not make the essence of the corresponding technical solution depart from the spirit and scope of the technical solutions of the embodiments of the present disclosure, and should be covered by the scope of the present disclosure. Therefore, the scope of the present disclosure should be determined by the scope of the accompanying claims.

The invention claimed is:

1. A two-dimensional wind-speed and wind-direction sensor, comprising: an X-direction wind speed probe assembly and a Y-direction wind speed probe assembly, wherein the X-direction wind speed probe assembly and the Y-direction wind speed probe assembly are perpendicular to each other, the X-direction wind speed probe assembly is configured to measure an X-direction wind speed, the X-direction wind speed comprises a wind speed in a reverse direction of an X-axis, and a wind speed in a forward direction of the X-axis; and the Y-direction wind speed probe assembly is configured to measure a Y-direction wind speed, the Y-direction wind speed comprises a wind speed in a reverse direction of a Y-axis, and a wind speed in a forward direction of the Y-axis, wherein the X-direction wind speed probe assembly comprises: an X-direction fixing base, a first X-direction wind speed probe and a second X-direction wind speed probe;

the first X-direction wind speed probe and the second X-direction wind speed probe are provided in opposite directions; the first X-direction wind speed probe is configured to detect the wind speed in the forward direction of the X-axis; and the second X-direction wind speed probe is configured to detect the wind speed in the reverse direction of the X-axis;

the X-direction fixing base comprises a first X-direction clamping slot portion, an X-direction clamping-slot connecting portion and a second X-direction clamping slot portion, which are connected sequentially, the X-direction clamping-slot connecting portion is of a hollow structure, an interior of the X-direction clamping-slot connecting portion is provided with a first connecting optical fiber, and the first connecting optical fiber is configured to connect the first X-direction wind speed probe and the second X-direction wind speed probe;

a slot opening of the first X-direction clamping slot portion and a slot opening of the second X-direction clamping slot portion face opposite directions, a slot section of the first X-direction clamping slot portion is parallel to a slot section of the second X-direction clamping slot portion, and the slot sections of the first X-direction clamping slot portion and the second X-direction clamping slot portion are perpendicular to the X-axis; and a size of the first X-direction clamping slot portion and a size of the second X-direction clamping slot portion respectively match a size of the first X-direction wind speed probe and a size of the second X-direction wind speed probe; and the first X-direction clamping slot portion is configured to receive the first X-direction wind speed probe, and the second X-direction clamping slot portion is configured to receive the second X-direction wind speed probe.

2. The two-dimensional wind-speed and wind-direction sensor according to claim 1, wherein the Y-direction wind speed probe assembly comprises: a Y-direction fixing base, a first Y-direction wind speed probe and a second Y-direction wind speed probe;

the first Y-direction wind speed probe and the second Y-direction wind speed probe are provided in opposite directions; the first Y-direction wind speed probe is configured to detect the wind speed in the reverse direction of the Y-axis; and the second Y-direction wind speed probe is configured to detect the wind speed in the forward direction of the Y-axis;

the Y-direction fixing base comprises a first Y-direction clamping slot portion, a Y-direction clamping-slot connecting portion and a second Y-direction clamping slot portion, which are connected sequentially, the Y-direction clamping-slot connecting portion is of a hollow structure, an interior of the Y-direction clamping-slot connecting portion is provided with a second connecting optical fiber, and the second connecting optical fiber is configured to connect the first Y-direction wind speed probe and the second Y-direction wind speed probe;

a slot opening of the first Y-direction clamping slot portion and a slot opening of the second Y-direction clamping slot portion face opposite directions, a slot section of the first Y-direction clamping slot portion is parallel to a slot section of the second Y-direction clamping slot portion, and the slot sections of the first Y-direction clamping slot portion and the second Y-direction clamping slot portion are perpendicular to the Y-axis; and a size of the first Y-direction clamping slot portion and a size of the second Y-direction clamping slot portion respectively match a size of the first Y-direction wind speed probe and a size of the second Y-direction wind speed probe; and the first Y-direction clamping slot portion is configured to receive the first Y-direction wind speed probe, and the second Y-direction clamping slot portion is configured to receive the second Y-direction wind speed probe.

3. The two-dimensional wind-speed and wind-direction sensor according to claim 2, wherein a high-strength heat-insulating ceramic base is adopted for the X-direction fixing base and/or the Y-direction fixing base.

4. The two-dimensional wind-speed and wind-direction sensor according to claim 1, further comprising: a three-way joint, a first optical cable joint and a second optical cable joint, wherein two ends of the X-direction wind speed probe assembly are respectively connected with the three-way joint and the first optical cable joint; and two ends of the Y-direction wind speed probe assembly are respectively connected with the three-way joint and the second optical cable joint.

5. The two-dimensional wind-speed and wind-direction sensor according to claim 4, further comprising: a first bracket, a second bracket and a third bracket, wherein the first bracket is connected with the three-way joint, the second bracket is connected with the first optical cable joint, and the third bracket is connected with the second optical cable joint.

6. The two-dimensional wind-speed and wind-direction sensor according to claim 4, further comprising an ambient temperature grating probe, wherein the ambient temperature grating probe is provided within the second optical cable joint or the first optical cable joint, and the ambient temperature grating probe is configured to measure an ambient temperature.

7. The two-dimensional wind-speed and wind-direction sensor according to claim 1, wherein the X-direction wind speed probe assembly and/or the Y-direction wind speed probe assembly of the two-dimensional wind-speed and wind-direction sensor are connected with an external detecting device through an optical fiber; and the optical fiber comprises a first optical fiber and a second optical fiber, the X-direction wind speed probe assembly is connected with the first optical fiber, the Y-direction wind speed probe assembly is connected with the second optical fiber, and the first optical fiber and the second optical fiber are connected in series, and configured to be connected with the detecting device; or the optical fiber comprises a first optical fiber and a second optical fiber, the X-direction wind speed probe assembly is connected with the first optical fiber, the Y-direction wind speed probe assembly is connected with the second optical fiber, and the first optical fiber and the second optical fiber are configured to be connected to two ports of the detecting device, respectively.

8. A two-dimensional wind-speed and wind-direction sensor system, comprising: a detecting device and the two-dimensional wind-speed and wind-direction sensor according to claim 1, wherein the detecting device is connected with the two-dimensional wind-speed and wind-direction sensor.

9. The two-dimensional wind-speed and wind-direction sensor system according to claim 8, wherein the X-direction wind speed probe assembly and/or the Y-direction wind speed probe assembly of the two-dimensional wind-speed and wind-direction sensor is connected with the detecting device through an optical fiber; and the optical fiber comprises a first optical fiber and a second optical fiber, the X-direction wind speed probe assembly is connected with the first optical fiber, the Y-direction wind speed probe assembly is connected with the second optical fiber; the first optical fiber and the second optical fiber are connected in series, and configured to be connected with the detecting device; the optical fiber further comprises a third optical fiber, the third optical fiber is provided inside a first optical cable joint or a second optical cable joint, the three optical fiber is configured to be connected with one port of the detecting device; and the detecting device comprises: a pumping light source, an optical fiber grating demodulator and a wavelength division multiplexer, both of the pumping light source and the optical fiber grating demodulator are connected with the wavelength division multiplexer, and the wavelength division multiplexer is connected with the two-dimensional wind-speed and wind-direction sensor through the third optical fiber; or the optical fiber comprises a first optical fiber and a second optical fiber, the X-direction wind speed probe assembly is connected with the first optical fiber, the Y-direction wind speed probe assembly is connected with the second optical fiber; the first optical fiber and the second optical fiber are respectively connected with two ports of the detecting device;

and the detecting device comprises: a pumping light source, an optical fiber grating demodulator, a wavelength division multiplexer and a coupler, the coupler comprises three ports, both of the pumping light source and the optical fiber grating demodulator are connected with the wavelength division multiplexer, the wavelength division multiplexer is connected with a first port of the coupler, and a second port and a third port of the coupler are respectively connected with the first optical fiber and the second optical fiber of the two-dimensional wind-speed and wind-direction sensor.

* * * * *